UNITED STATES PATENT OFFICE.

UNJI IOKA, OF SAKAI, OSAKA-FU, JAPAN.

PROCESS OF REMOVING THE ODOR FROM FISH-OIL.

1,340,050.

No Drawing.

Specification of Letters Patent. Patented May 11, 1920.

Application filed February 10, 1919. Serial No. 276,206.

*To all whom it may concern:*

Be it known that I, UNJI IOKA, a subject of the Empire of Japan, residing at No. 37 Zaimokucho Higashi-nicho, Sakai, Osaka-fu, Japan, have invented certain new and useful Improvements in the Process of Removing the Odor from Fish-Oil, of which the following is a specification.

My invention relates to the process of removing the offensive odor common to fish oil by its chemical action with saw-dust of cypress and cedar, and green cedar leaves.

The object of my invention is to manufacture the most useful refined fish oil of superior quality by a simple method of removing the peculiar bad smell which is liable to make fish oil unusable for paints and other manufactures.

To practise my invention, I carefully mix up fish oil, saw-dust of cypress, saw-dust of cedar, and green cedar leaves, in the proportion of 5 gallons of oil, 3¼ quarts of saw-dust of cypress, 3¼ quarts of saw-dust of cedar, and 2½ pounds of green cedar leaves. This material is placed in a suitable kettle, to heat the mixture from one to two hours. I then cool it and then filter it. Lastly I expose the filtered oil to the sunlight in a shallow tub for about three days. By this process the smell of fish oil entirely vanishes through its chemical action with the volatile organic matter contained in the saw-dust and leaves, and at the same time the color of oil is also bleached light yellowish. The refuse of filtered saw-dust and green leaves being more or less oily can be used for fuel.

The process of my invention is carried out in a very simple manner and I have determined by practical experiment that there is no revival of the odor either after heating or long storage. The oil produced is of excellent quality and can be used not only for paints as substitutes for linseed oil, Japanese tung oil, perilla ocimoides oil, etc., but also for many other purposes.

Having thus described my invention, what I claim as new, and desire to secure by Letters Patent, is—

The herein described process for removing the odor from fish oil which consists in mixing the oil to be treated with saw-dust of cypress, saw-dust of cedar, and green cedar leaves; subjecting the mixture to heat; cooling; filtering; and then exposing the filtered oil to sunlight, substantially as described.

UNJI IOKA.

Witnesses:
SUEO HOSHIKO,
M. S. SHUSHI.